United States Patent
Tyckowski

(10) Patent No.: US 6,359,408 B1
(45) Date of Patent: Mar. 19, 2002

(54) LOW COST OBJECT DETECTION CIRCUIT FOR VEHICLE CLOSURE

(75) Inventor: Joseph Tyckowski, Clawson, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/596,124

(22) Filed: Jun. 16, 2000

(51) Int. Cl.$^7$ .............................................. E05F 15/16
(52) U.S. Cl. ........................ 318/469; 318/266; 318/286
(58) Field of Search .................................. 318/264, 265, 318/266, 286, 434, 466, 467, 468, 469

(56) References Cited

U.S. PATENT DOCUMENTS

| | | | |
|---|---|---|---|
| 4,272,708 A | * 6/1981 | Carle et al. | 318/266 |
| 4,709,196 A | * 11/1987 | Mizuta | 318/282 |
| 4,900,994 A | * 2/1990 | Mizuta | 318/283 |
| 5,701,063 A | * 12/1997 | Cook et al. | 318/469 |
| 5,734,245 A | * 3/1998 | Terashima et al. | 318/453 |
| 6,054,822 A | * 4/2000 | Harada | 318/434 |

* cited by examiner

Primary Examiner—Bentsu Ro
(74) Attorney, Agent, or Firm—Carlson, Gaskey & Olds

(57) ABSTRACT

A vehicle closure member has a low cost object detection circuit, which utilizes a number of simple circuit elements. Essentially, a present characteristic of the vehicle is compared to a past state characteristic. The difference between those two values is taken and compared to a limit. If the limit is exceeded then an object detection is indicated. Since the detection is based upon actual readings the circuit is adapted to individual system dynamics. The present invention utilizes a pair of low pass filters, a summing amplifier and a comparator along with one threshold circuit to achieve this function. The complete circuit utilizes a second threshold consideration along with an AND gate. In total, a very low cost control circuit which provides very accurate results is provided.

18 Claims, 1 Drawing Sheet

US 6,359,408 B1

LOW COST OBJECT DETECTION CIRCUIT FOR VEHICLE CLOSURE

BACKGROUND OF THE INVENTION

This invention relates to a vehicle closure object detection circuit which utilizes a few low cost simple circuit elements, thus reducing the cost of the circuit. On the other hand, the circuit adapts to the individual system dynamics, and is thus quite dependable.

Vehicle closures are typically powered by a motor, at the control of an operator closure request switch. Thus, an operator will actuate a switch and the closure will move toward a closed position. Such closures include cab windows, moon roofs, sun roofs, etc.

There may sometimes be an obstruction in the closure path. As an example, a vehicle passenger could have an arm extending outwardly of a window. Known vehicle closure controls monitor a system characteristic, such as motor torque, speed, current, etc. If the monitored characteristic differs from an expected value, then a decision may be made by the control that an object is in the path of the closure element.

One problem with these circuits is that to store or calculate an expected value typically requires a complex control circuit. Often, microprocessor based controls are utilized. It would be desirable to achieve a circuit which provides a good prediction of an obstruction in the path of the closure with a relatively low cost.

Further, even these complex controls have had some difficulty in adapting to the individual characteristics of the particular system. Every component in the closure system has manufacturing tolerances. Each tolerance has the potential of moving the total response further the expected values. The prior art has not proposed a low cost, yet adaptable control circuit.

SUMMARY OF THE INVENTION

In a disclosed embodiment of this invention, a simple and low cost control circuit is designed which relies upon one simple assumption. The simple assumption is that the monitored characteristic will not change significantly, at least after an initial start-up period, unless an object is encountered. Thus, in a disclosed embodiment, a monitored characteristic is passed to a circuit element which delays the monitored characteristic from being considered. A difference between the delayed value, and a present value is then taken. This difference is compared to a threshold at a comparator. If the difference exceeds the threshold, then an indication is made that an object has been encountered.

Since the "expected value" is not predetermined but instead is an actual system characteristic, the circuit accounts for past tolerances and the individual system response.

The present invention achieves the above goals with a very simple circuit which includes a few simple circuit elements. In particular, a characteristic being monitored is delivered to two low pass filters. A first low pass filter removes high frequency components. The second low pass filter has a cutoff frequency much lower than a response expected when the system loads against an object. The second filter output is slow to respond to changes. Thus, the output of the second filter could be said to be the "past" state of the system, whereas the output of the first filter is a present state. A difference of the two filter outputs is taken by a summing amplifier. That difference is passed to a comparator along with a threshold. If the difference exceeds the threshold then an indication is made that an object has been encountered. Essentially, this invention relies upon the assumption that the characteristic should not change significantly over the time of window travel. Thus, if the difference does exceed the threshold, an assumption is made that an object has been detected.

In further features of this invention, the threshold utilized at the comparator can decrease after a short start-up value. Typically, higher differences can be expected at start-up, and thus, the threshold will typically move to lower values after a short start-up period. Alternatively, an AND element can be incorporated into the circuit downstream of the comparator. The AND element will require not only an indication from the comparator that an object has been encountered, but further, an enabling signal is required. The enabling signal may be stopped during a start-up time transient. In this way, an indication of an obstruction during a short start-up transient will not be considered. The enabling signal can also be stopped at an end of travel position for the closure. In this way, the change in the characteristic when the closure hits the frame will not be identified as an obstruction.

The output from the first filter may also be passed to a second comparator, and compared to a second threshold. This can be utilized to determine an obstruction should the output of the second filter merely exceed a predetermined threshold. Typically, this second threshold will be higher than the first threshold. Thus, should there be an immediate spike in the monitored characteristic, the second threshold should be crossed and an indication of an obstruction will be quickly made.

These and other features of the present invention would be best understood from the following specification and drawings, the following of which is a brief description.

DETAILED DESCRIPTION OF A PREFERRED EMBODIMENT

Figure 1:
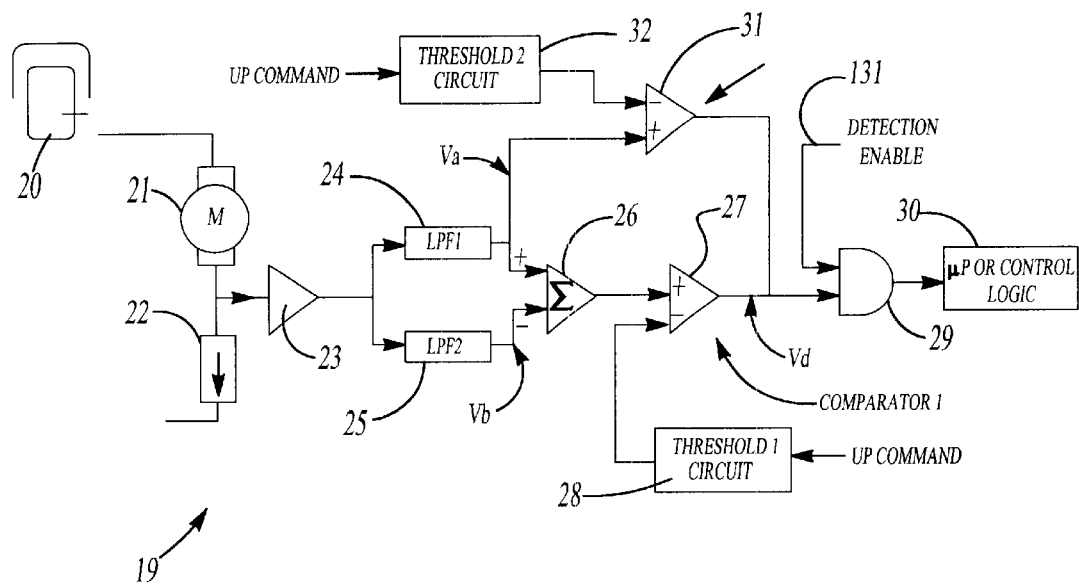
FIG. 1 is a schematic of a system for driving a vehicle closure.

A vehicle closure system 19 is illustrated in FIG. 1 having a closure member 20, shown schematically, driven to close by a motor 21. A sensing device 22 outputs a characteristic of operation of the system 19. Here, the sensing device outputs an equivalent voltage which is equivalent to the current through the motor 21. An amplifier 23 amplifies this equivalent voltage, and delivers the amplified equivalent voltage to a first low pass filter 24 and a second low pass filter 25. The first low pass filter 24 filters high frequency components. Its output voltage Va responds quickly to changes in current which such as may occur due to the presence of an object in the path of the closure. The second low pass filter 25 has a cutoff frequency which is lower than the current response when the system loads against an object. Thus, its value should not change when an object is encountered. Also its output voltage Vb is slow to respond to changes. The output Va and Vb are both sent to a summing amplifier 26 with the Vb value being more negative than Va. The difference of the two values is then sent to a comparator 27. A threshold circuit 28 provides a threshold value to the comparator 27 for comparison to the difference value. The output voltage Vd of comparator 27 is the object indicator for this system. This output voltage Vd is sent to AND gate 29. If a detection enable signal 131 is positive, and the output of the comparator 27 is also positive, then the AND gate 29 will send a signal to a control logic 30 that an object is encountered. The detection enable may be shut off initially to provide a startup period of time when no obstruction will be identified.

The detection enable signal may also be shut off once an end of travel position has been reached. At the end of travel, the closure is typically abutting the frame, and further movement could result in a change in the monitored characteristic which would otherwise be associated with an obstruction. Thus, by turning off the enable signal at the end of travel, such false readings of an obstruction will be avoided.

The Va component is also sent to a second comparator 31. A second threshold circuit 32 provides its signal to the comparator 31. Should either comparator 27 or 31 show an exceeded threshold, then a positive signal is sent to the AND element 29.

Essentially, the first threshold is exceeded if the difference between the two values is greater than a predetermined limit. This will show that a change in the system is occurring. The second threshold is utilized to respond quickly to any significant spikes in the Va value. The thresholds are preferably selected to be linearly proportional to a voltage being supplied to the drive motor. An up motor activation command may be input to the threshold circuits to trigger the start of the threshold function.

Figure 2:
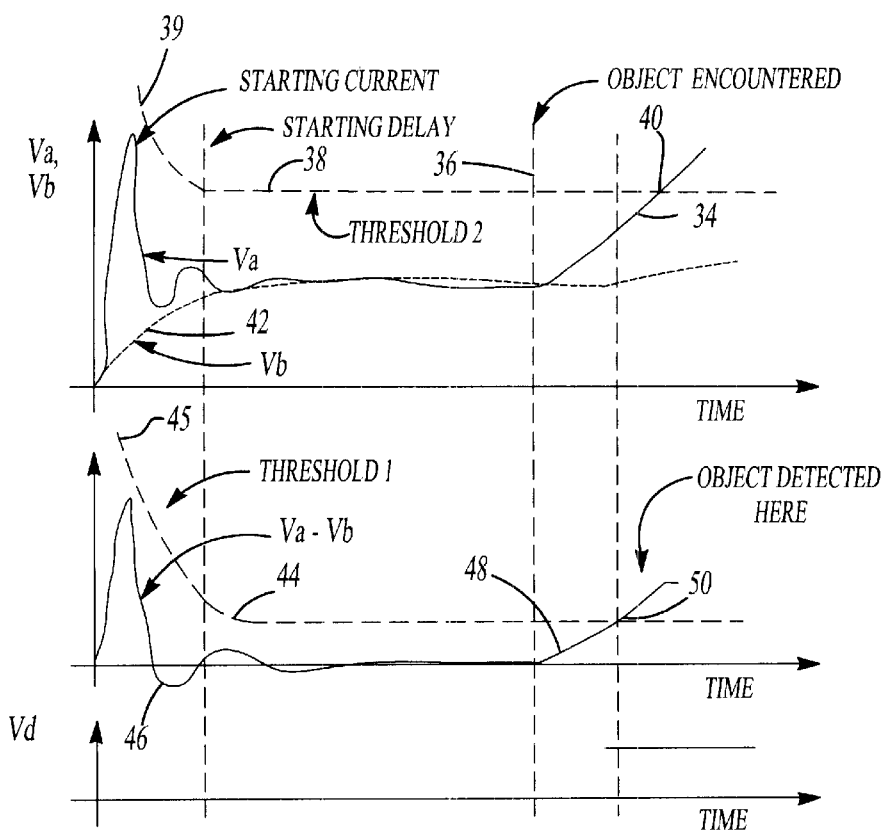
FIG. 2 shows a sample system response from the present invention.

As shown in FIG. 2, the Va value will have significant movement during startup. The Vb value is shown to be smoother and lower during this transient period. However, once the startup delay has passed, then the Va and Vb values are relatively constant. Threshold 2 is shown being above the values Va and Vb and having an initial high portion 39 decaying to a steady state portion 38. Again, it is anticipated that the starting current will be high, and that the threshold 2 must thus start at a high value also. As shown at 34, after a point 36, the Va value begins to increase significantly. Point 36 shows when an object is initially encountered. VA eventually crosses threshold 2 (38) at point 40. When increase 34 is more rapid, the threshold 2 will be crossed more quickly and identify the obstruction.

The bottom portion of FIG. 2 shows the effect of threshold 1. Again, threshold 1 is shown as having a decaying portion 45 and a steady state portion 44. As mentioned, the decaying portion 45 may be eliminated, and the enable signal may simply be kept off during the starting delay. As shown, the difference Va−Vb has peaks and valleys due to the starting change in the current. However, the difference quickly becomes essentially zero. At time 36, an object is encountered. The difference begins to move upwardly as shown at 48. The difference crosses threshold 44 at point 50. Notably, point 50 will occur somewhat earlier in time than point 40 as shown in this drawing. Thus, by looking at the difference, the instant control circuit is able to more quickly identify an obstruction.

Although one embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle closure system comprising:
    a closure moveable between opened and closed positions;
    a motor for driving said closure; and
    a control circuit for monitoring a characteristic during movement of said closure, said control circuit including an element for providing a delayed indication of said characteristic, and an element for comparing said delayed characteristic to a present characteristic and determining a difference, said difference being compared to a first limit, and an object detection being indicated if the difference exceeds the limit, said characteristic being sent to two low pass filters, with a first of said filters filtering off high frequency signals and a second of said filters providing a delay, the output of said first and second filters being sent to a summing element, and the output of said summing element being sent to a first comparator to be compared to said first limit.

2. A system as recited in claim 1, wherein said characteristic is based on motor current.

3. A system as set forth in claim 1, wherein said first limit begins with high values that move to lower values after a startup period of time.

4. A system as set forth in claim 1, wherein the output of said first comparator is sent to an AND gate along with an enable signal, and if the output of said first comparator and said enable signal are both appropriate, said AND gate passing a signal indicating an object has been detected.

5. A system as set forth in claim 4, wherein said enable signal is not sent until after a startup transient period of time.

6. A system as set forth in claim 1, wherein said first limit is provided by a threshold circuit which also receives a signal indicative of a second characteristic during movement of said closure.

7. A system as set forth in claim 6, wherein said second characteristic is the voltage received by said motor.

8. A system as set forth in claim 1 wherein the output of said first filter is also sent to a second comparator, and a second limit is sent to said second comparator, said second limit being utilized to identify peaks in the present signal of the characteristic.

9. A system as set forth in claim 8, wherein if the output of either of said comparators is positive, a signal is sent indicating that an object has been encountered.

10. A system as set forth in claim 9, wherein an output of each of said first and second comparators is sent to one input of an AND gate, and a second input of said AND gate receives a detection enable signal.

11. A system as set forth in claim 10, wherein said detection enable signal is off during a start up transient.

12. A system as set forth in claim 10, wherein said detection enable signal is shut off when said closure reaches an end of travel position.

13. A system as set forth in claim 12, wherein the control circuit delaying any object detection until after a predetermined period of time after start up.

14. A system as set forth in claim 10, wherein the control circuit delaying any object detection until after a predetermined period of time after start-up.

15. A method as set forth in claim 10, wherein the control circuit comparing a present value to a second limit, said second limit being selected to identify a significant peak in said present value.

16. A vehicle closure system comprising:
    a closure moveable between opened and closed positions;
    a motor for driving said closure; and a control circuit for monitoring a characteristic during movement of said closure, said control circuit including an element for providing a delayed indication of said characteristic, and a first comparator for comparing said delayed characteristic to a present characteristic and determining a difference, said difference being compared to a first limit, and an object detection being indicated if the difference exceeds the limit;

a second comparator receiving said present characteristic, and a second limit also being sent to said second comparator, said second limit being utilized to identify peaks in the present signal of the characteristic.

17. A system as set forth in claim 16, wherein if the output of either of said first and second comparators is positive, a signal is sent indicating that an object has been detected.

18. A vehicle closure system comprising:

a closure moveable between opened and closed positions;

a motor for driving said closure; and a control circuit for monitoring a characteristic during movement of said closure, said control circuit including an element for providing a delayed indication of said characteristic, and an element for comparing said delayed characteristic to a present characteristic and determining a difference, said difference being compared to a first limit, and an object detection being indicated if the difference exceeds the limit, said difference being computed at a comparator, the output of said comparator being sent to an AND gate along with an enable signal, and the output of said comparator and said enable signal both being positive, said AND gate passing a signal indicating an object has been detected, said enable signal not being sent until after a start-up transient period of time to eliminate false reads during a start up transience.

\* \* \* \* \*